United States Patent
Cherdakov et al.

(10) Patent No.: US 10,073,265 B2
(45) Date of Patent: Sep. 11, 2018

(54) IMAGE PROCESSING DEVICE AND IMAGE PROCESSING METHOD FOR SAME

(71) Applicant: LG ELECTRONICS INC., Seoul (KR)

(72) Inventors: Dmitry Cherdakov, Seoul (KR); Kyungdong Choi, Seoul (KR); Vasiliy Lomanov, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/501,165

(22) PCT Filed: Feb. 23, 2015

(86) PCT No.: PCT/KR2015/001707
§ 371 (c)(1),
(2) Date: Feb. 1, 2017

(87) PCT Pub. No.: WO2016/035952
PCT Pub. Date: Mar. 10, 2016

(65) Prior Publication Data
US 2017/0227774 A1 Aug. 10, 2017

(30) Foreign Application Priority Data

Sep. 3, 2014 (KR) .................. 10-2014-0116820

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| 5,991,086 A * | 11/1999 | Carroll ............... G02B 7/00 359/630 |
| 2006/0033992 A1 | 2/2006 | Solomon |
| 2015/0016777 A1* | 1/2015 | Abovitz ............ G02B 27/225 385/37 |

FOREIGN PATENT DOCUMENTS

| KR | 1020090085260 | 8/2009 |
| KR | 1020110135053 | 12/2011 |
| KR | 1020130064955 | 6/2013 |

OTHER PUBLICATIONS

PCT International Application No. PCT/KR20151001707, International Search Report dated May 19, 2015, 2 pages.

(Continued)

*Primary Examiner* — Christopher Kohlman
(74) *Attorney, Agent, or Firm* — Lee Hong Degerman Kang & Waimey

(57) ABSTRACT

In the present specification, an image processing device and an image processing method for same are disclosed. An image processing device for processing images according to an embodiment of the present invention comprises: a receiving unit for receiving content; a controller for turning retinal scanning on and measuring an accommodation, and calculating a focal depth based on the measured accommodation and controlling in order to generate an image according to the calculated focal depth; and an output unit for outputting the generated image.

8 Claims, 8 Drawing Sheets

(56) References Cited

OTHER PUBLICATIONS

Brian T. Schowengerdt et al., "True three-dimensional displays that allow viewers to dynamically shift accommodation, bringing objects displayed at different viewing distances into and out of focus", Dec. 2004, 12 pages.

* cited by examiner

IMAGE PROCESSING DEVICE AND IMAGE PROCESSING METHOD FOR SAME

CROSS-REFERENCE TO RELATED APPLICATIONS

This application is the National Stage filing under 35 U.S.C. 371 of International Application No. PCT/KR2015/001707, filed on Feb. 23, 2015, which claims the benefit of earlier filing date and right of priority to Korean Application No. 10-2014-0116820, filed on Sep. 3, 2014, the contents of which are all hereby incorporated by reference herein in their entirety.

TECHNICAL FIELD

The present invention relates to an image processing device, and more particularly, to the image processing device configured to process an image to have a flexible focus or an accommodative focus according to a user rather than a fixed focus.

BACKGROUND ART

Such an image processing device as a CRT (Cathod-Ray Tube), an LCD (Liquid Cristal Display), a Projector, a wearable device, and the like processes an image using a fixed focal depth, i.e., a fixed focus, irrespective of a user.

Yet, when eye sight is different from each other according to a user and there are various conditions such as surroundings, if a user watches an image through an image processing device processing an image with a legacy fixed focus, the user may feel inconvenience due to an out of focus or it may be difficult for the user to properly feel an effect of a processed image. And, in case of the aforementioned case, the user may feel tired in a few minutes after starting to watch an image.

DISCLOSURE OF THE INVENTION

Technical Tasks

Accordingly, the present invention is directed to an apparatus for and method thereof that substantially obviate one or more of the problems due to limitations and disadvantages of the related art. A technical task of the present invention is to provide an image processing device for processing an image not based on the image processing device but based on a user-specific focal depth, i.e., an accommodative focus.

Another technical task of the present invention is to maximize a watching effect and minimize watching fatigue while watching images through an image processing device by processing the images in a manner of applying an accommodative focal depth to a user.

Another technical task of the present invention is to simply configure a device for processing images with an accommodative focal depth and apply the device to various digital devices.

The other technical task of the present invention is to increase product satisfaction and raise purchase need of a user by providing watching convenience to the user through the image processing device.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In order to perform the tasks, an image processing device and a method of processing an image are disclosed in the present specification.

To achieve these and other advantages and in accordance with the purpose of the present invention, as embodied and broadly described, according to one embodiment, a method of processing an image, which is processed in an image processing device, includes the steps of receiving a content, measuring accommodation by turning retinal scanning on, calculating a focal depth based on the measured accommodation, generating an image according to the calculated focal depth, and outputting the generated image.

To further achieve these and other advantages and in accordance with the purpose of the present invention, according to a different embodiment, an image processing device for processing an image includes a receiving unit configured to receive a content, a controller configured to measure accommodation by turning retinal scanning on, calculate a focal depth based on the measured accommodation, and generate an image according to the calculated focal depth, and an output unit configured to output the generated image.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

Accordingly, the present invention provides the following effects or advantages.

According to one embodiment of the present invention, it is able to provide an image processing device for processing an image with a user-specific focal depth.

According to a different embodiment of the present invention, it is able to maximize a watching effect and minimize watching fatigue while images are watched through an image processing device by processing the images in a manner of applying an accommodative focal depth to a user.

According to a further different embodiment of the present invention, it is able to simply configure a device for processing images with an accommodative focal depth and apply the device to various digital devices.

According to a further different embodiment of the present invention, it is able to increase product satisfaction and raise purchase need of a user by providing watching convenience to the user through the image processing device.

Effects obtainable from the present invention may be non-limited by the above mentioned effect. And, other unmentioned effects can be clearly understood from the following description by those having ordinary skill in the technical field to which the present invention pertains.

BEST MODE

Figure 1:
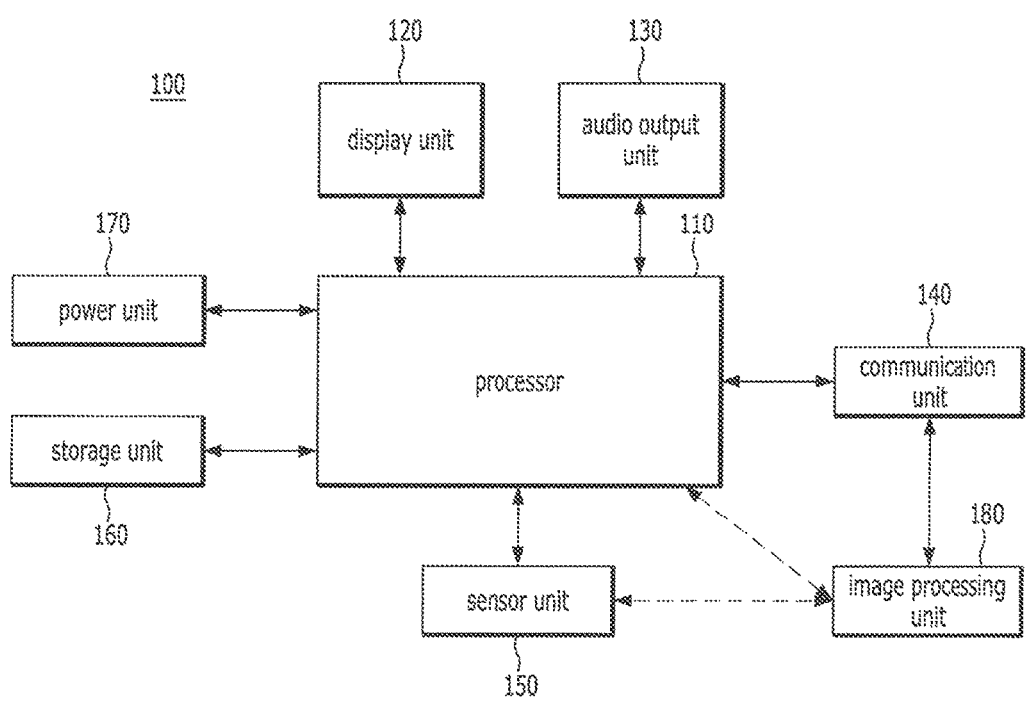
FIG. 1 is a configuration block diagram for explaining an image processing device according to one embodiment of the present invention.

In the following, various embodiments for an image processing device and a method of processing an image according to the present invention are explained in detail with reference to drawings.

In general, a suffix such as "module" and "unit" may be used to refer to elements or components. Use of such a suffix herein is merely intended to facilitate description of the specification, and both of the suffixes can be used in a manner of being mixed invention. Moreover, a terminology, each of which includes such an ordinal number as $1^{st}$, $2^{nd}$ and the like, may be used to describe various components. In doing so, the various components should be non-limited by the corresponding terminologies, respectively.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Meanwhile, contents described in the present specification and/or drawings correspond to preferred embodiments according to the present invention, by which the present invention may be non-limited. The scope of right of the present invention should be determined based on the claims.

An "image processing device" descried in the present specification corresponds to all devices including a configuration(s) for processing an image with an accommodative focal depth or focus to a user instead of a predetermined fixed focal depth or focus without considering a user according to the present invention. The image processing device itself may become a digital device or the image processing device can be attached or embedded to such a digital device as a CRT (Cathod-Ray Tube), an LCD (Liquid Crystal Display), a PDP (Plasma Display Panel), a projector, a DTV (digital television), a wearable device (WD), and the like. In the following, in order to help understanding of the present invention and for clarity of explanation, an image processing device according to the present invention is separately explained. In this case, the image processing unit is explained with an example of a digital device to which the image processing device is attached or embedded. The digital device is explained with an example of a wearable device. Hence, an image processing device may correspond to a device configured by the image processing configurations only or a digital device including the device, i.e., a wearable device, in the following description depending on the context of the description. Meanwhile, the image processing device may include all digital devices outputting an image, information and the like in a manner of being attached/detached to/from a body of a user.

The wearable device includes such various devices for displaying an image in a manner of being attached to a user as a glass-type device such as a smart glass, a smart watch, an HMD (head mounted display), lens, an EMD (eye mounted display), eye-glass, eye-piece, eye-wear, an HWD (head worn display), and the like. In order to help understanding of the present invention and for clarity of explanation, assume that the wearable device corresponds to a wearable device of a glass-type in the present specification. It is apparent that the idea of the present invention is also applicable to a device implemented by a different type with the same or similar scheme. Meanwhile, the wearable device can also be referred to as a wearable display device.

Besides, "image" described in the present specification can include not only a stationary image but also a video image.

FIG. 1 is a configuration block diagram for explaining an image processing device according to one embodiment of the present invention.

According to one embodiment of the present invention, an image processing device for processing an image includes a receiving unit configured to receive content, a controller configured to measure accommodation by turning retinal scanning on, calculate a focal depth based on the measured accommodation, and generate an image according to the calculated focal depth, and an output unit configured to output the generated image.

The receiving unit can receive contents including image data from an external device according to wired/wireless communication protocol.

The controller can calculate the focal depth from a predetermined focal depth based on accommodation according to eye lens of a user and the retina on which an image is focused. The controller can include a light source unit configure to output light for an image to be outputted according to the calculated focal depth, a processing unit configured to process outputted light, and a prismatic reflection unit configured to output the light processed by the processing unit to eyes of a user by performing prismatic reflection on the light.

As shown in FIG. 1, an image processing device 100 can include a processor 100, a display unit 120, an audio outputting unit 130, a communication unit 140, a sensing unit 150, a storage unit 160, a power unit 170, and an image processing unit 180.

Figure 2:
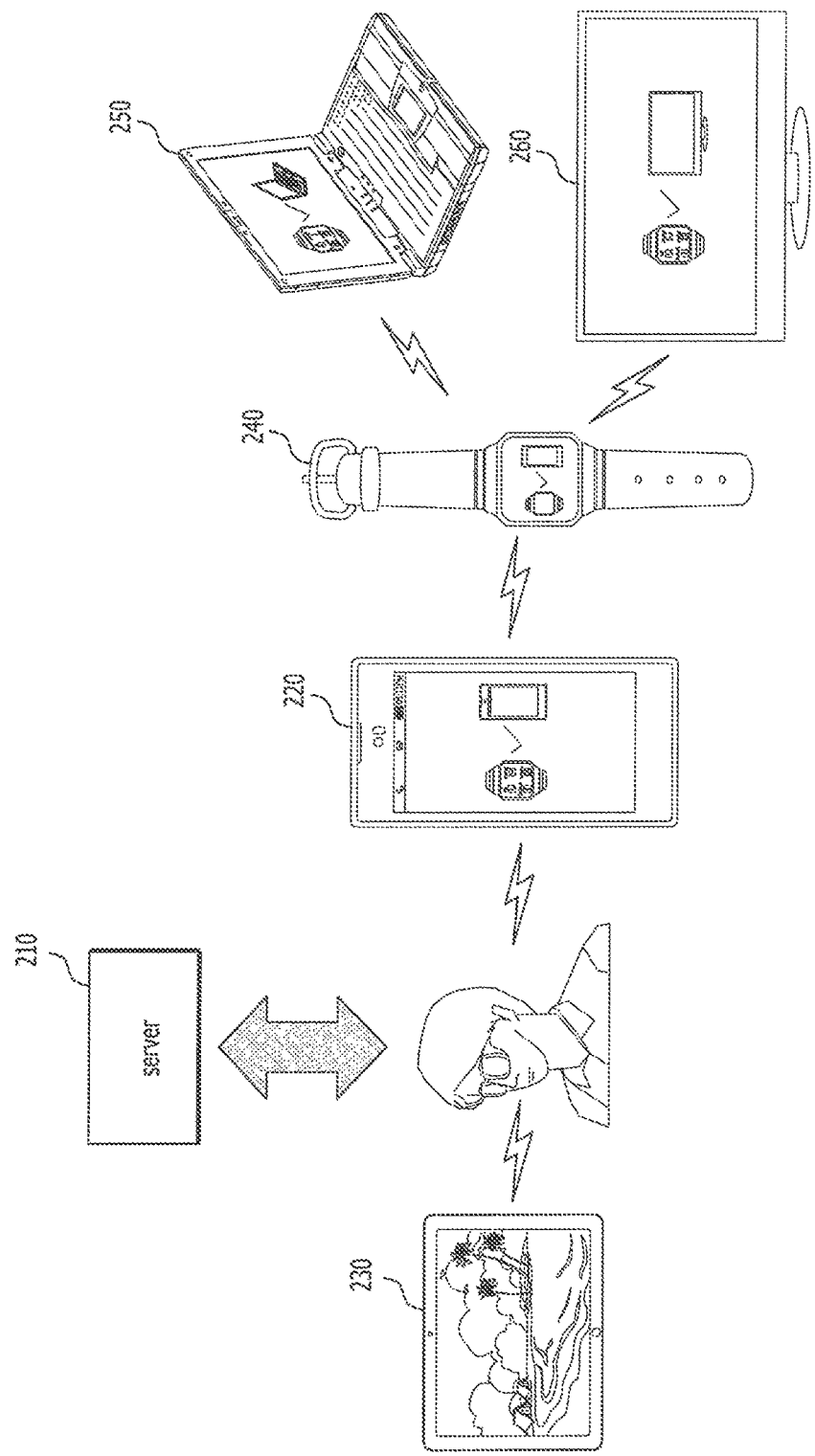
FIG. 2 is a diagram for a digital device(s) capable of being interlocked with an image processing device according to one embodiment of the present invention.

The display unit outputs an image and/or a user interface (UI). As shown in FIG. 2, the display unit 120 can transmit/receive data in a manner of being interlocked with external device(s) through the communication unit 140. In this case, the display unit 120 can output images of the external device(s) interlocked with the display unit by receiving the images in real time or in non-real time.

The audio output unit 130 outputs audio data for an image received through the processor 110. In this case, the audio output unit 130 can be implemented in a form of an audio output means such as a speaker, an ear phone, and the like implemented on an image processing device or a form of a jack or an interface for connecting with the speaker or the ear phone. Besides, similar to the aforementioned display unit 120, the audio output unit receives audio data from the external device(s) and may be able to output the audio data after the audio data is processed by the processor 110.

The communication unit 140 transmits/receives data with an external device or an external communication network via various communication protocols. The communication protocols can include all wired/wireless communication protocols including LTE (Long Term Evolution), LTE-A (advanced), Wi-Fi, Bluetooth, and the like. Hence, in order to support the wired/wireless communication protocol(s), the communication unit 140 can include a necessary communication processing means. In this case, the communication processing means can be included in the processor 110. Meanwhile, the processor 110 or the communication unit 140 discovers external devices capable of being connected with the processor 110 or the communication unit 140 via a network, pairs or connects with an available external device(s) among the discovered external device(s), and transceives data with the paired external device(s).

The sensing unit 150 includes one or more sensors installed in the image processing device 100 and senses not only a user action such as a gesture, a user input, and eye-status of a user but also various data for surroundings of the image processing device 100 based on the one or more sensors to obtain sensed data. For example, the sensed data are forwarded to the processor 110 or the image processing unit 180 to process an image. The sensors or the sensing means included in the sensing unit 150 can include at least one selected from the group consisting of a gravity sensor, a terrestrial magnetism sensor, a motion sensor, a gyro sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, an illumination sensor, an eye-tracking sensor, and an eye-status sensor. Meanwhile, although the present specification describes a case that the aforementioned sensors are directly installed in the image processing device 100, by which the present invention may be non-limited. In other word, sensing data capable of being obtained from the sensors can also be received from external sensors. For example, the sensing unit 150 of the image processing device may receive data sensed by a sensor which is installed in a smart watch worn on a wrist of a user. Or, the sensing unit 150 may receive sensing data from a sensor installed in a digital device of a chip shape which is implanted to a body of a user. Moreover, the processor 110 can appropriately combine sensing data collected from a plurality of sensors. Although it is not depicted, an imaging sensor or a camera sensor can be included in the sensing unit 150 as well.

The storage unit 160 stores various data including a video, an audio, a picture, an application, and the like. the storage unit 160 includes a flash memory, a RAM (random access memory), an SSD (solid state drive), a HDD (hard disc drive), and the like. The storage unit 160 can temporarily store data received from an external device through the communication unit 140. In this case, the storage unit 160 may use the data received from the external device for the purpose of buffering to output the data on the image processing device 100. Meanwhile, although the storage unit 160 or a memory is installed in the outside or inside of the image processing device 100 in the present specification, in some cases, the storage unit 160 or the memory may include an external storing medium connected with the storage unit 160 or the memory via an interface. Although it is not depicted, the external storing medium can include a mobile device such as a notebook, a smartphone, and a tablet PC, a BD (Blu-ray Disc) player, a cloud server, an internet server, and the like.

The power unit 170 corresponds to a battery embedded in the image processing device 100 or a power source connected to external power and provides power to the image processing device 100. The power unit 170 can include not only a wire jack or an interface for receiving external power but also a wireless power interface related to wireless power supply.

The processor 110 plays a role of a controller performing not only data management and processing of the image processing device 100 but also overall controlling process. Meanwhile, although it is not depicted, the processor 110 can include codec necessary for processing various data, configuration(s) for encoding/decoding, etc. Besides, the processor 110 can further include a configuration for processing CAS (conditional access system), DRM (digital rights management), and the like.

The image processing device 100 shown in FIG. 1 corresponds to a block diagram according to one embodiment of the present invention. If necessary, configuration blocks shown in FIG. 1 can be modulized, or vice versa. And, the image processing device 100 shown in FIG. 1 can be implemented by a single chip or a plurality of chips depending on a design of the device.

FIG. 2 is a diagram for a digital device(s) capable of being interlocked with an image processing device according to one embodiment of the present invention.

An image processing device can transmit and receive data by communicating with a remote digital device(s) and/or a server via a wire/wireless network.

Referring to FIG. 2, the image processing device can transmit and receive data with a server 210 in a manner of being connected with the server via a wire/wireless network. in this case, the server 210 can include at least one selected from the group consisting of a broadcasting server, a content server, a service server, a head-end or SO/MSO (system operator/multiple SO), a private server, and a cloud server.

As mentioned in the foregoing description, the image processing device cans transceive data with digital device(s) in a manner of being connected with the digital device(s) via a wire/wireless network. In this case, the digital device(s) can include both a mobile device such as a smartphone 220, a tablet PC 230, a smart watch 240, and a notebook 250, and a stationary device such as a DTV 260, and a PC (not depicted).

Meanwhile, the image processing device can transceive data with one or more digital devices in a manner of being connected with the one or more digital devices. When the data is transceived with the digital device(s), although the image processing device is not directly paired with a corresponding digital device, the image processing device can indirectly transceive data with the digital device through a different digital device.

Meanwhile, although it is not depicted, it may use a relay or a router between the image processing device and the external server 210 due to various reasons such as a not-supported communication protocol, a long distance, noise, increase of power consumption, and the like. If necessary, the relay or the router may process data for the image processing device and/or the external server 210 or a digital device.

Figure 3:
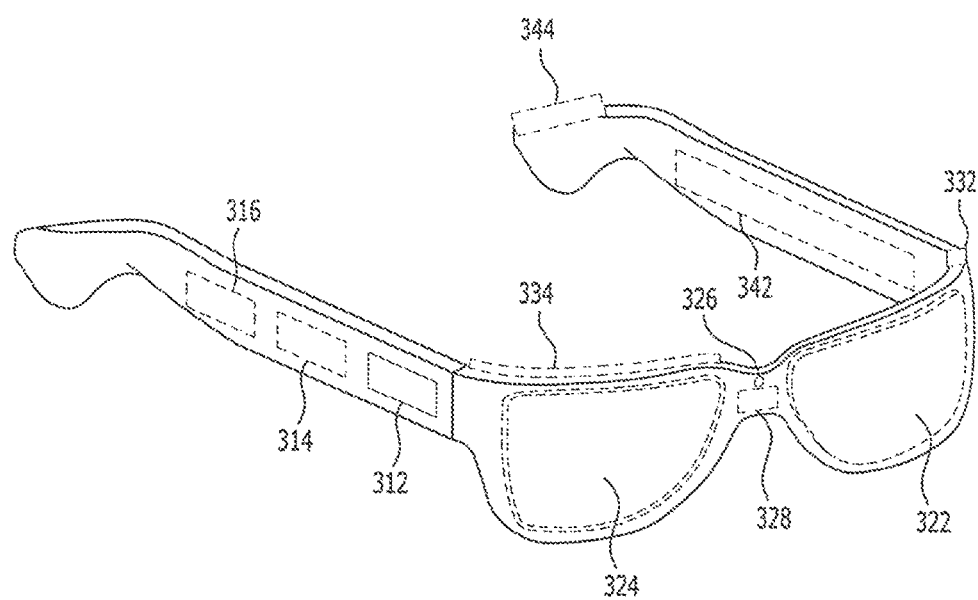
FIGS. 3 and 4 are diagrams for explaining a configuration element and a function of an image processing device.
Figure 4:
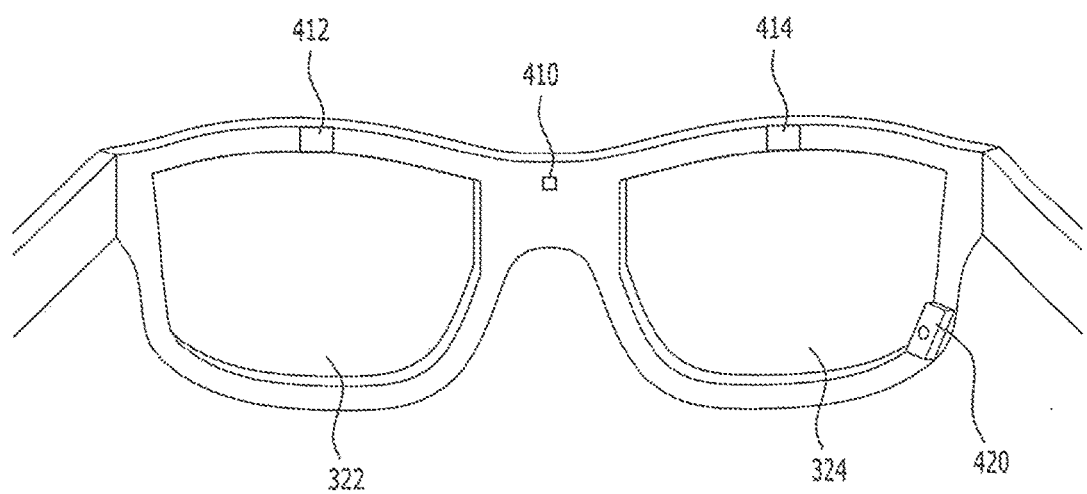

FIGS. 3 and 4 are diagrams for explaining a configuration element and a function of an image processing device.

An external configuration of a glass-type image processing device and a function of the image processing device are explained in more detail with reference to FIGS. 3 and 4.

The glass-type image processing device is mainly divided into a body part and a mounting part.

The body part is divided into a left/right display 322/324 to which a see-through display for outputting content is adopted and a bridge unit supporting the left/right display 322/324.

In this case, as mentioned in the foregoing description, the bridge unit can be used not only for a basic function of supporting and fixing the left/right display 322/324 but also for a controlling procedure of the image processing device in a manner of installing various interfaces or sensors in the bridge unit depending on a position of the bridge unit. A camera sensor 326, a tracking system 328, and the like can be mounted between the left display 322 and the right display 324 in the front of the bridge unit.

The camera sensor 326 captures an image/video and provides a sensed data to the processor 110.

The tracking system 328 controls and tracks contents outputted through the left/right display 322/324.

Besides, a controlling unit 334 for controlling resolution of an outputted content, a position on which an image is focused, and the like may exist at the top of the left/right display 322/324. The controlling unit 334 is implemented by a form of a touch pad to control the resolution or the position on which an image is focused according to a touch of a user touching the touch pad in left and right direction.

And, a microphone 330 can be installed in the bottom of the left/right display 322/324. The microphone 330 plays a role of an interface for receiving external audio and voice of a user such as voice recording, search, or quick search. Audio data received through the microphone 330 can be processed by the processor 310.

Besides, an antenna may be installed in one side of the bridge unit to receive a signal or check sensitivity.

The mounting part is used for mounting the image processing device on a part of a body of a user to support or fix the image processing device. The mounting part consists of an external side and an internal side. The external side and the internal side can perform a different configuration or function. The mounting part can be divided into a left mounting part and a left mounting part in the aspect of a user. An external side of the right mounting part includes a touch pad 316, a computing system & communication interface unit 314, a power unit 316 from an area close to the body part.

Meanwhile, an internal side of the left mounting part may correspond to an area 342 on which a battery is mounted. On the other hand, an internal side of the right mounting part and an external side of the left mounting part correspond to the internal side of the left mounting part and the external side of the right mounting part, respectively. Yet, it is apparent that each side of each mounting part can be implemented by a different configuration according to a necessity. And, a farthest part from the body part in the mounting part, i.e., a tail part 344 can be used for the usage of a module for a specific function or an auxiliary battery.

For example, FIG. 4 shows the inside of the body part of the image processing device.

A proximity sensor 410 is installed in between the left display 322 and the right display 324. In this case, the proximity sensor 410 determines whether or not the image processing device is worn on a user and measures a distance between the image processing device and pupils of the user. The image processing device minimizes consumption power based on information sensed by the proximity sensor 410 according to a state of the image processing device to perform not only such a function as smart power management, stopping of playback data, bookmark, storing, but also such a function as user-specific focal depth adjustment according to the present invention.

Meanwhile, an eye tracking system or a sensor 412/414/420 (hereinafter, eye tracking sensor) can be installed in one side or both sides of the mounting part of the body part supporting the left and the right display 322/324. Basically, the eye tracking sensor 412/414/420 collects sensing information on movement of pupils of a user. In this case, the information sensed by the eye tracking sensor can be used to perform various functions according to a current state of the image processing device. In this case, for example, the state of the image processing device may correspond to a functional aspect of the image processing device such as playing video data, receiving a text message, and the like. For example, if video data is played in the image processing device, the playback of the video data can be stopped based on the information sensed by the eye tracking sensor.

Or, when an image is outputted in the image processing device, it may move to a next image or a previous image based on the information sensed by the eye tracking sensor. Besides, the information sensed by the eye tracking sensor can also be used for determining whether the image processing device is in an active state or an inactive state.

For example, if sensing data is suddenly not collected for more than a prescribed time, it can be mainly considered as two cases. One is a case that a user takes off the image processing device and another one is a case that the user closes eyes for a long time. In case of the former case, it is determined as an inactive state and the image processing device is switched to a sleep mode. In case of the latter case, it is difficult to determine a state using a proximity sensor or other sensor. For example, although it may be able to determine whether or not a user is sleeping using an inclination sensor or a movement sensor, it is not perfect. Yet, since a person generally sleeps while closing eyes, it may be able to determine whether or not a user sleeps by independently using eye tracking information or combining the eye tracking information with information sensed by the inclination sensor or the movement sensor. If it is determined as the user is sleeping, it can be determined as the inactive state. Then, the image processing device is automatically switched to a sleep mode to manage power and provide convenience to the user.

Meanwhile, the aforementioned proximity sensor 410 or the eye tracking sensor may perform a function of the eye-status sensor according to the present invention. In other word, although there is no separately installed eye-status sensor according to the present invention, the proximity sensor 410 or the eye tracking sensor 412/414/420 can perform the function of the eye-status sensor. It may be able to process an image with a focal depth, i.e., focus, specified to a user using the image processing device only based on data sensed by the sensors and data stored in advance. If a user using the image processing device is different from a previous user, a focal depth specified to the user is calculated again and the focal depth is applied to the user. Image processing via a flexible focus can be performed through the eye tracking sensors 412/414/420.

Figure 5:
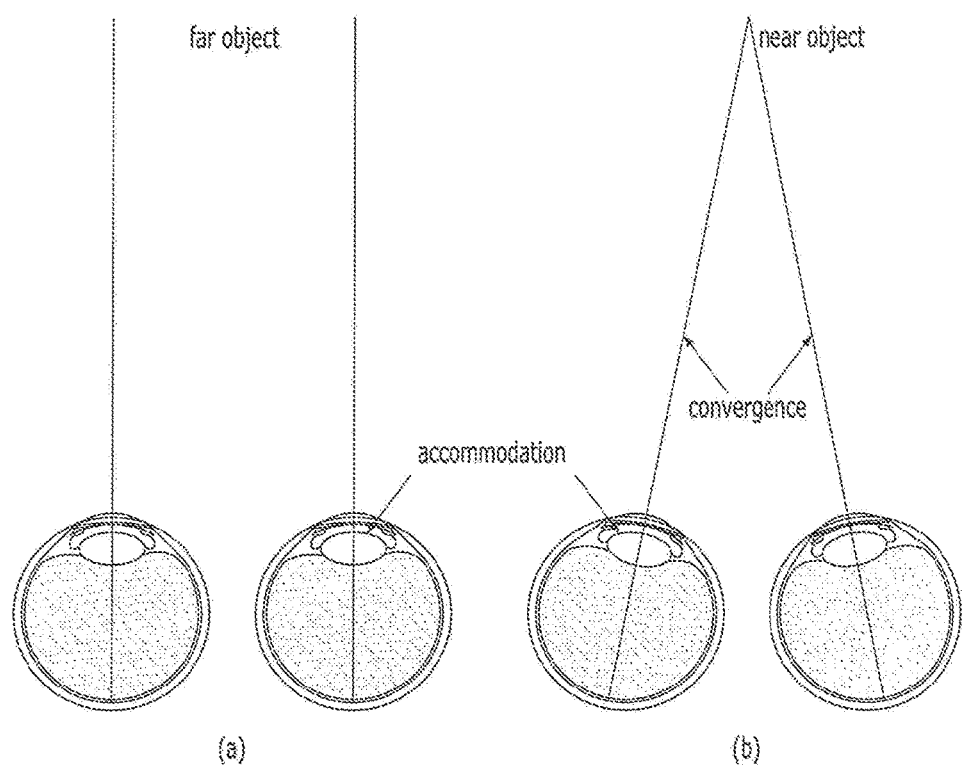
FIG. 5 is a diagram for explaining an image processing concept according to one embodiment of the present invention.

FIG. 5 is a diagram for explaining an image processing concept according to one embodiment of the present invention.

Human eyes can see an object only when there is light. The eyes can distinguish darkness from color, identify near and far, and sense a three dimensional effect. And, the eyes can control the amount of light coming into the eyes according to brightness of surroundings and have control capability capable of watching a far object after watching a near object. The human eyes have a size of about 2.5 cm in diameter, have a shape of a ball bulging into the front, and are elastic.

The outermost of the eyes is surrounded by the sclera to protect the eyes. The eyes consist of the retina at which visual cells are distributed to focus an image of an object, the choroid for preventing scattering of light, the iris for controlling the amount of light entering into the eyes by changing a size of a pupil, the eye lens for precisely focusing an image to the retina by refracting light, a ciliary body corresponding to a muscle for controlling thickness of the eye lens, a vitreous body for maintaining a shape of the eyes with transparent liquid filling between the eye lens and the retina, and the like.

Since the choroid of black color is positioned in the inside of the sclera of white color, light can enter into the eyes through the pupil only. The fore part of the eyes consists of a cornea. Light passes through the cornea and the light is retracted by the eye lens of a lens shape to focus an image to the retina. The retina is located at the inside of the sclera and consists of many visual cells. The retina corresponds to a place to which an image is focused similar to film of a camera. In this case, although the image focused on the retina corresponds to an upside down shape, human brain recognizes the image as a normal position.

Since the cornea is rounded in shape, light entering from a point is respectively retracted into a different angle. The retracted light forms an image of which left and right are changed and upside down to the retina. If the visual cells are stimulated, the signal is delivered to the cerebrum through a visual nerve and the eyes can see an object.

As mentioned in the foregoing description, the eyes have a control function. First of all, the eyes can control darkness. A size of the pupil is controlled by contracting and relaxing the iris to control the amount of light entering into the eyes. A second control function of the eyes is to control near and far (distance). An image of an object can be precisely focused on the retina by controlling the thickness of the eye lens by contracting and relaxing the ciliary body.

Vision can be delivered by the following path. The eyes can recognize an object through light, the cornea, the eye lens, the vitreous body, the retina, the visual nerve, and the cerebrum.

FIG. 5a shows a movement or a gaze direction of pupils in case of watching a far object and FIG. 5b shows a movement or a gaze direction of pupils in case of watching a near object. In case of the former case, since a left pupil and a right pupil are watching a far object, gaze directions are parallel. On the contrary, in case of the latter case, since the left pupil and the right pupil are watching a near object, convergence occurs between the gaze directions.

Meanwhile, FIG. 5 shows accommodation. The accommodation plays a role in precisely forming an image of a watching object to the retina by reflectively controlling a retraction state of the eye lens of the eyes. If an intention of clearly watching an object works, similar to the focusing of a camera, focusing of the eyes is rapidly performed involuntarily or voluntarily to make the image of the object to be more clearly formed on the retina. This is referred to as a control action. Central nerves of the control action are located at plexus of a brain stem and innervation nerve of a regulating muscle corresponds to a part of the oculomotor nerves. The innervation nerve passes through ciliary ganglion and nervi ciliares longi and arrives at ciliary muscle. The control action is performed in a manner that the ciliary muscle changes refraction of the eye lens. The control action means to control a sensory organ to clearly accommodate stimulation. In case of an object getting close to a user, three changes occur on vision to clearly form an image to the retina. This is referred to as vision control. First of all, if the ciliary muscle is contracted, tension added to the eye lens is relaxed and the eye lens has original elasticity. Hence, the refraction of the eye lens increases. Secondly, pupils are contracted by a muscle arranged to the iris in a ring shape. Thirdly, eyeballs are gathered into the center heading to the approaching object. In particular, in relation to the present invention, the accommodation can be used as capability of eyes capable of focusing targets located at a different distance by changing a shape of the eye lens. A muscle sense, which occurs when the ciliary muscle of the eyes is controlled to focus the targets located at a different depth, can provide information on a depth of a target.

According to the present invention, it may be able to calculate a user-specific focal depth and process an image by applying the calculated user-specific focal depth to the image with reference to the aforementioned accommodation of the human eyes. By doing so, it may be able to maximize an image processing effect according to a flexible focus and prevent watching fatigue, and the like.

Figure 6:
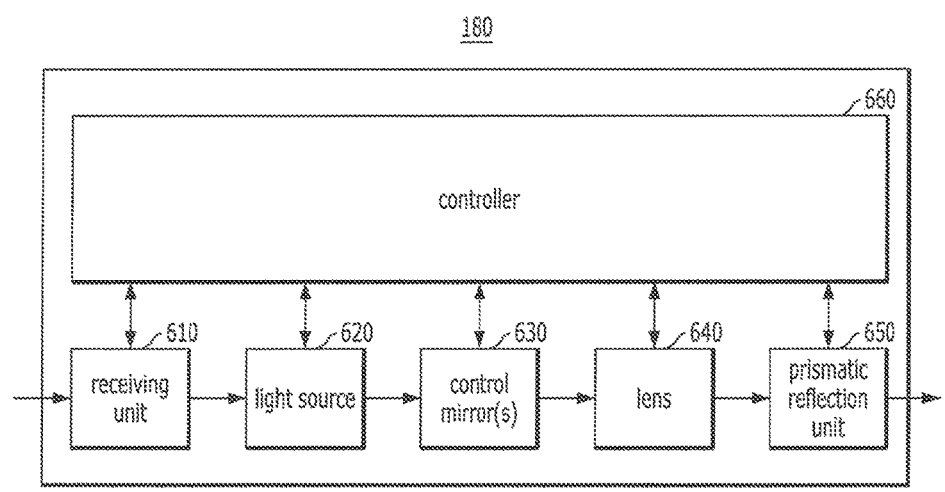
FIG. 6 is a diagram for a detail configuration block diagram for an image processing unit shown in FIG. 1 configured according to one embodiment of the present invention.

FIG. 6 is a diagram for a detail configuration block diagram for an image processing unit shown in FIG. 1 configured according to one embodiment of the present invention.

As shown in FIG. 6, in order to process an image, an image processing unit 180 can include a receiving unit 610, a light source 620, one or more control mirrors 630, a lens 640, a prismatic reflection unit 650, and the like.

The receiving unit 610 receives an image data. In some cases, the receiving unit 610 receives a sensing data for processing an image sensed from external. As mentioned in the foregoing description, the sensing data for processing the received data is used to determine a focal depth for a user-specific focus. The sensing data is sensed through an eye-status sensor, a proximity sensor, an eye-tracking sensor, or the like. Meanwhile, although it is not depicted, the aforementioned sensor can be embedded to the image processing unit 180.

The controller 660 estimates accommodation based on the obtained sensing data, calculates a user-specific focus based on the estimated accommodation, calculates a focal depth for processing an image which is received according to the calculated focus, and controls the focal depth to be applied to the image processing.

The light source 620 processes and delivers the image data, which is received according to the calculated focal depth, based on the estimated accommodation.

The one or more control mirrors 630 correspond to mirrors manufactured by MEMS (micro electro mechanical systems), i.e., Microelectromechanical System. The one or more control mirrors forward the image data transmitted by the light source 620 to the lens based on the estimated accommodation according to the calculated focal depth.

The lens 640 controls optical power according to the focal depth which is calculated based on the estimated accommodation and forwards the forwarded image data to the prismatic reflection unit 650 described in the following.

The prismatic reflection unit 650 outputs image data according to the focal depth, which is calculated based on the estimated accommodation, by including a prismatic reflection-transparent configuration.

Figure 7:
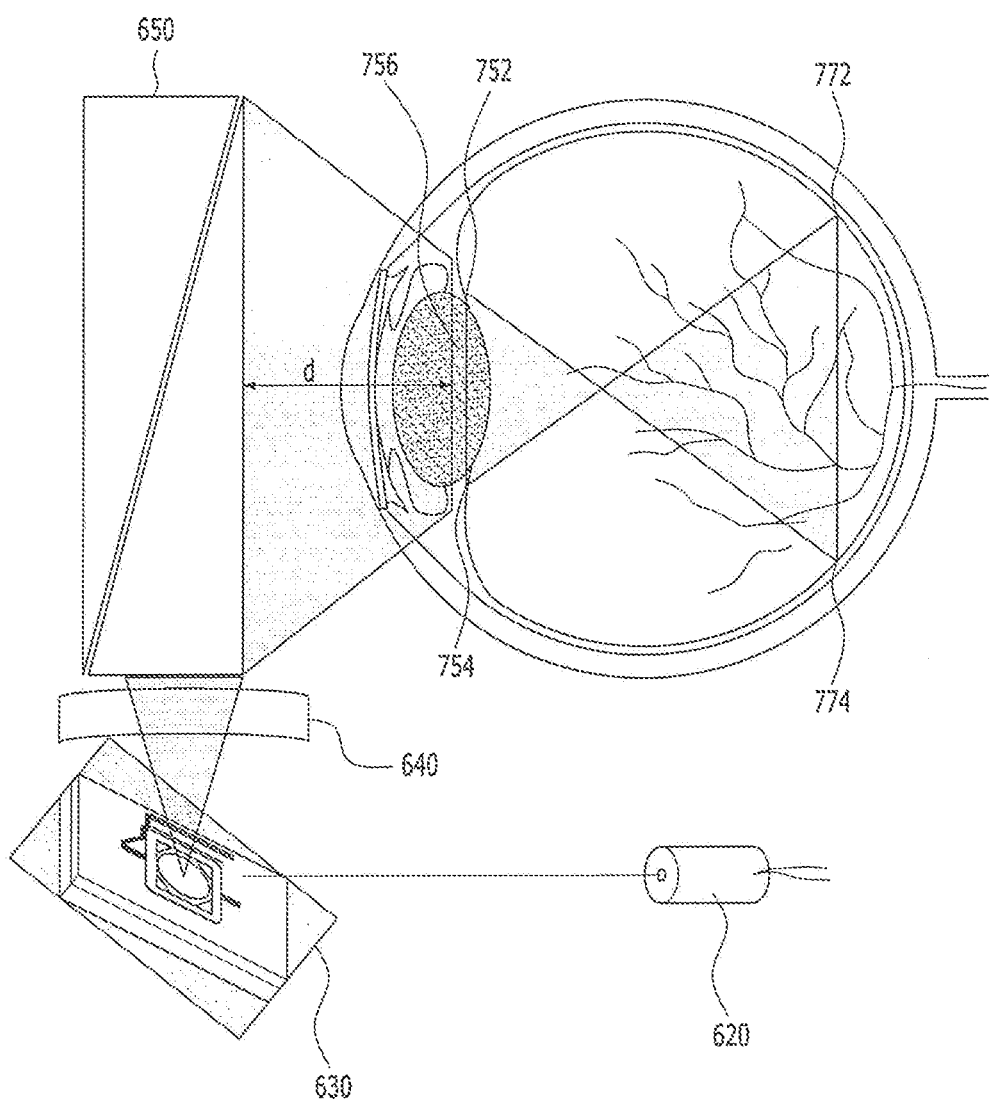
FIG. 7 is a diagram for explaining an image processing procedure according to one embodiment of the present invention.

FIG. 7 is a diagram for explaining an image processing procedure according to one embodiment of the present invention.

A function of the image processing unit, i.e., an image processing procedure, is explained in more detail in the following with reference to FIG. 7.

Explanation on the light source 620, the control mirrors 630, the lens 640, and the prismatic reflection unit 650 included in the image processing unit is identical to what is mentioned earlier.

As mentioned in the foregoing description, image data (light) passes through a cornea, an eye lens, and a vitreous body and forms an upside down image on the retina. If a visual nerve included in the retina recognizes the image, cerebrum is able to recognize the image.

Referring to FIG. 7, the image processed by the image processing unit is received by a cornea or a pupil 756 apart from the prismatic reflection unit 650 or an output unit as much as a prescribed distance (d). The image is refracted through an eye lens and an image of which left and right are changed and upside down is formed on the retina 772/774.

In this case, as a ciliary muscle 752/754 shown in FIG. 7 is contracted, tension added to the eye lens is relaxed and the eye lens has original elasticity. As a result, refraction of the eye lens changes. As mentioned in the foregoing description, accommodation is achieved.

Figure 8:
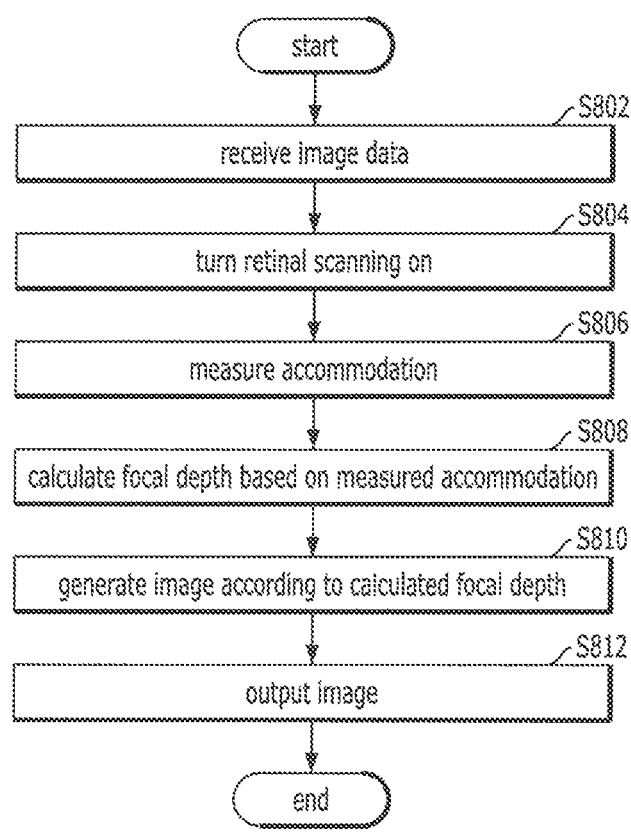
FIG. 8 is a flowchart for explaining an image processing procedure according to one embodiment of the present invention.

FIG. 8 is a flowchart for explaining an image processing procedure according to one embodiment of the present invention.

According to one embodiment of the present invention, an image processing procedure of an image processing unit receives image data [S802] and senses the data by turning retinal scanning on [S804].

Accommodation is measured based on the data obtained via the retinal scanning of the step S804 [S806].

A user-specific focal depth is calculated based on the measured accommodation [S808].

An image is processed and generated according to the calculated focal depth [S810].

The generated image data is outputted [S812].

In this case, the received content may correspond to an image data received from an external device according to wire/wireless communication protocol.

The focal depth can be calculated from a predetermined focal depth according to the accommodation in accordance with the eye lens of the user and the retina on which an image is formed.

An output of the image can include the steps of outputting light for an image to be outputted according to the calculated focal depth in a light source, processing the outputted light in a control mirror and a lens; and outputting the light processed in the control mirror and the lens to eyes of a user by performing prismatic reflection on the light.

The image processing device can be installed in a wearable device.

MODE FOR INVENTION

According to the present invention, it is able to provide an image processing device for processing an image with a user-specific focal depth, maximize a watching effect and minimize watching fatigue by processing the images in a manner of applying an accommodative focal depth to a user, simply configure a device for processing images with an accommodative focal depth, and apply the device to various digital devices. And, according to the present invention, it is able to increase product satisfaction and raise purchase need of a user by providing watching convenience to the user through the image processing device.

The image processing device described in the present specification can be provided in a manner of being implemented in various device forms. In particular, the image processing device can be implemented in various device forms capable of providing a display to a user as a glass-type device in a manner of being worn on the user. The various forms may include not only a HMD but also an EMD (eye mounted display), eyeglass, eyepiece, eye wear, HWD (head worn display), and the like. The image processing unit is not restricted by the terms described in the present specification.

A digital device and a method of processing content in the digital device disclosed in the present specification are not restricted by the configuration and the method of the aforementioned embodiments. In order to make various modifications from the embodiments, all or a part of each embodiment can be configured in a manner of being selectively combined.

Meanwhile, according to the present invention, the method of operating the digital device disclosed in the present specification can be implemented with a code readable by a processor in a recording media readable by the processor. The examples of the recording media readable by the processor may include a ROM (read only memory), a RAM (random access memory), a CD-ROM, a magnetic tape, a floppy disc, an optical data storing device and the like. And, implementing in a form of a carrier wave (e.g., transmission via the internet and the like) is also included. And, the recording media readable by the processor are distributed to computer systems connected with each other via a network. Hence, a code readable by the processor is stored and executed using a distribution scheme.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

INDUSTRIAL APPLICABILITY

The present invention relates to an image processing device and a method of processing an image. Since the device and the method can be used in a digital device, it is industrially usable.

What is claimed is:

1. A method for generating an image that is performed at an image processing device, the method comprising:
receiving a content;
retinal scanning of a user's eye to estimate accommodation for the eye to permit a desired focus on a retina of the user's eye;
calculating a focal depth based on the estimated accommodation, an eye lens of the user, and the retina of the user's eye;
generating the image for the content according to the calculated focal depth; and
outputting the generated image to permit receiving of the generated image by the user's eye.

2. The method of claim 1, wherein the received content corresponds to an image data received from an external device according to a wire/wireless communication protocol.

3. The method of claim 1, wherein the output of the generated image comprises:
outputting light according to the calculated focal depth;
processing the outputted light by a control mirror and a lens; and
outputting the light processed by the control mirror and the lens to eyes of the user by performing prismatic reflection on the light.

4. The method of claim 1, wherein the image processing device is installed in a wearable device.

5. An image processing device for generating an image, comprising:
a receiving unit configured to receive a content;
an output unit; and
a controller configured to:
retinal scan a user's eye to estimate accommodation for the eye to permit a desired focus on a retina of the user's eye;
calculate a focal depth based on the estimated accommodation, an eye lens of the user, and the retina of the user's eye; and
generate the image for the content according to the calculated focal depth; and
output, via the output unit, the generated image to permit receiving of the generated image by the user's eye.

6. The image processing device of claim 5, wherein the receiving unit is configured to receive the content containing an image data received from an external device according to a wire/wireless communication protocol.

7. The image processing device of claim 5, wherein the controller comprises a light source configured to output light according to the calculated focal depth, a processing unit configured to process the outputted light, and a prismatic reflection unit configured to output the light processed in the processing unit by performing prismatic reflection on the light.

8. The image processing device of claim 5, wherein the image processing device is installed in a wearable device.

* * * * *